Figure 1:
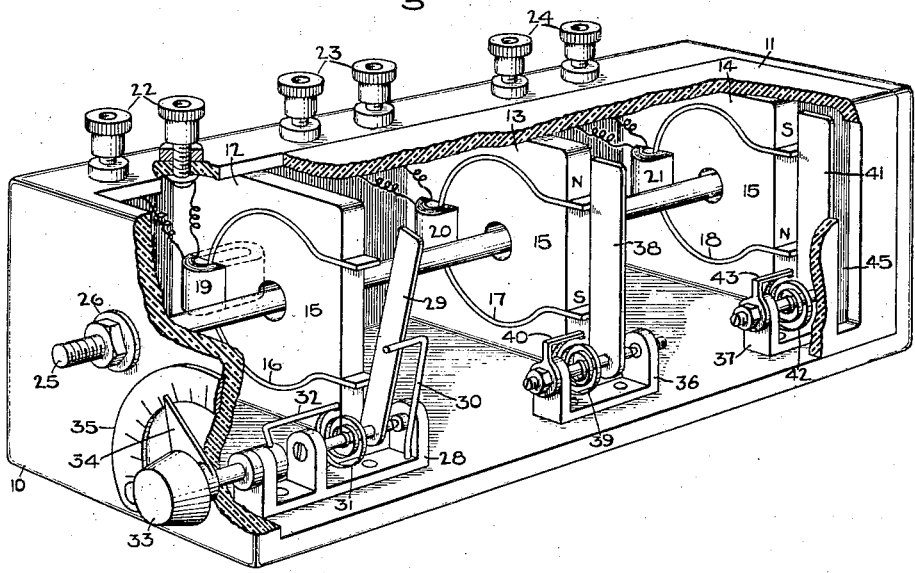

Sept. 25, 1934.　　　F. B. MENGER　　　1,975,065

SURGE CURRENT INSTRUMENT

Original Filed March 18, 1933

Inventor:
Francis B. Menger,
by Harry E. Dunham
His Attorney.

Patented Sept. 25, 1934

1,975,065

UNITED STATES PATENT OFFICE 1,975,065

SURGE CURRENT INSTRUMENT

Francis B. Menger, Schenectady, N. Y., assignor to General Electric Company, a corporation of New York Original application March 18, 1933, Serial No. 661,550. Divided and this application November 23, 1933, Serial No. 699,371

4 Claims. (Cl. 175—183)

This application relates to surge current instruments and is a division of my copending application Serial No. 661,550, filed March 18, 1933, and assigned to the assignee of this application. In my copending application there is disclosed a novel form of surge current indicator for indicating whether or not a surge current has passed through a conductor and the direction in which the surge current passed through the conductor, and there is also disclosed a novel form of surge current measuring instrument for measuring the maximum value of a surge current that passed through a conductor. The invention to be claimed in my copending application will relate to the surge current indicator, whereas the invention to be described and claimed in this divisional case will relate to the surge current measuring instrument.

In electrical installations it frequently occurs that an electric current surge flows through a conducting body for a very short period, and it is desired to have some instrument that will indicate this fact together with the direction in which the surge current flowed, the indication to remain visible after the occurrence of the surge.

There is also a long-felt need in the electrical industry for a simple and inexpensive instrument that will accurately measure the maximum value of an electric current surge that flowed through a conducting body, even though the surge lasts only a few micro-seconds. For example, there is an important need for an instrument that will accurately measure the maximum value of the current surge that flows through a transmission tower arm supporting the line insulators when the latter are flashed over by reason of a lightning stroke, or by reason of a switching operation and that will accurately measure the maximum value of the surge current that flows through a lightning arrester due to either of the above mentioned reasons. This information is of vital importance in lightning research and transmission system stability investigations, because it is a useful guide in determining what steps should be taken to decrease the number of trip-outs on a transmission system.

Various attempts have been made to measure the maximum value of these surge currents. For example, the latest practice was to utilize the voltage drop caused by the surge current flowing in the tower arm or leg, or in the lightning arrester ground lead, and to measure this voltage drop by means of a Lichtenberg figure camera, such as shown, for example, in United States Patent No. 1,649,180, Peters. The limited voltage sensitivity of this recorder made it necessary to bridge a considerable portion of the tower arm or leg, or lightning arrester ground lead, in order to obtain a sufficiently high voltage to operate the recorder. The effective resistance of the bridged portion was uncertain because of skin effect phenomena, and in addition the inductive voltage drop could not properly be taken into account. In view of these uncertain factors the measurement obtained of the surge current was unreliable. It therefore became desirable to provide an instrument that would accurately measure the maximum value of a surge current passing through a conducting body, irrespective of the duration of the surge.

My invention provides an instrument that will indicate whether or not a surge current has flowed through a conducting body, and that also will indicate the direction in which the surge current flowed. My instrument will also measure the maximum value of the surge current, irrespective of the direction in which it flowed through the conducting body. Briefly described, my instrument comprises three strips of magnetic material, two of these strips being initially magnetized, and the third strip possessing a high degree of magnetic retentivity and being initially unmagnetized, these strips being adapted to be so positioned adjacent the conducting body that the magnetic flux surrounding the latter during a current surge therethrough in a given direction passes through the strips in such a direction as to decrease the magnetic strength of one of the initially magnetized strips and to increase the magnetic strength of the other initially magnetized strip, and to magnetize the initially unmagnetized strip. Each initially magnetized strip has a movable magnetic armature which is normally held in an attracted position by the magnetic force of its strip and which is biased to move to another position in response to a predetermined decrease in the magnetic strength of its strip. Consequently, a current surge passing through the conducting body in one direction releases one armature so that it moves to its other position, and a current surge passing through the conducting body in the opposite direction releases the other armature so that it moves to its other position, thus not only indicating that a surge current has flowed through the conducting body, but also indicating the direction in which the surge current flowed. The initially unmagnetized strip also has a magnetic armature movable from one to the other of two positions, one of these positions being its attracted position when the strip is magnetized, the armature being biased to move to its other position. After a surge current has flowed through the conducting body in either direction, the initially unmagnetized strip becomes sufficiently magnetized so that its magnetic force is capable of holding its armature in the attracted position. This magnetic force is substantially directly proportional to the maximum value of the surge current. The instrument also comprises means for exerting on this armature an opposing force of sufficient magnitude to overcome the magnetic force of the strip holding the armature against its ends, and means for indicating in terms of surge current the magnitude of the opposing force exerted on the armature.

My invention, however, will be best understood from the following description when considered in connection with the accompanying drawing, while those features of my invention which are believed to be novel and patentable are pointed out in the appended claims.

Figure 2:
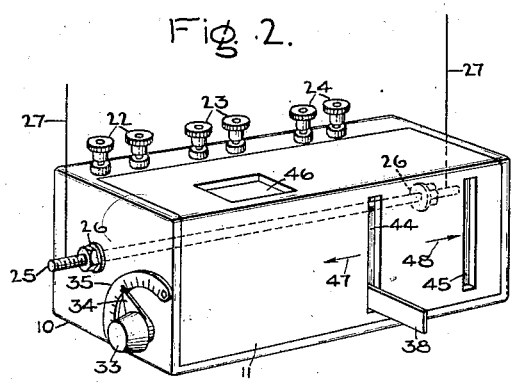

Fig. 1 represents a perspective view of a preferred form of my instrument, part of the casing and cover being broken away to show the internal parts. Fig. 2 represents a perspective view of the instrument with its casing and cover unbroken, and showing the instrument connected up with some conducting body, and also showing how it indicates that a current surge has flowed through the conducting body. Similar parts in both figures are represented by the same reference numerals.

Referring to both figures, 10 represents a casing which is preferably moulded out of insulating material and to which is removably secured by any suitable means (not shown) a cover 11 also preferably made of insulating material. The casing and cover are shown partly broken away in Fig. 1 in order to illustrate the mechanism inside of the casing, but are completely shown in Fig. 2. Inside of casing 10 and projecting from one of its walls are three substantially parallel plates 12, 13 and 14, these plates being integral with the casing and made out of the same material. The structures of these plates are identical, hence the structure of only one of them, for example 12, will be described. Plate 12 has a filler-piece 15 separated therefrom by a narrow horse-shoe shaped slot, the filler piece being preferably made of the same material as the plate and casing. The arrangement is such that by inserting into the slot a strip of material whose thickness is equal to the width of the slot, the plate, filler-piece and strip are held together as a unitary structure. The filler-pieces for plates 13 and 14 are also represented by 15. In the slot between plate 12 and its filler-piece is inserted a thin strip 16 of magnetic material possessing a high degree of magnetic retentivity, as, for example, cobalt steel. The length of strip 16 is such that it will have two spaced apart ends projecting slightly beyond the vertical edges of plate 12 and its filler-piece. In the slot between plate 13 and its filler-piece is inserted a thin magnet 17, preferably a permanent magnet, the length of the magnet being such that it will have two spaced apart ends projecting slightly beyond the vertical edges of the plate and its filler-piece. A similar magnet 18 is similarly placed in the slot between plate 14 and its filler-piece. Magnets 17 and 18 are positioned so that their magnetic poles are oppositely related. Thus, for example, magnet 17 is positioned so that its N pole is at the top and its S pole is at the bottom, whereas magnet 18 is so positioned that its S pole is at the top and its N pole is at the bottom.

Plate 12 and its filler-piece are suitably notched near the center of strip 16 so that a coil 19 may be positioned to surround the center portion of the strip in such a manner that the energization of the coil will effect the magnetization of the strip. Coil 19 is first placed in the notches of plate 12 and its filler-piece, and since strip 16 is flexible it is passed through the coil and then inserted in the slot between the plate and its filler-piece. Similar coils 20 and 21 are similarly placed to surround portions of magnets 17 and 18, respectively. The ends of coils 19, 20 and 21 are connected to the pairs of binding posts 22, 23 and 24, respectively, secured to casing 10. Casing 10 and filler-pieces 15 are provided with aligned holes suitably positioned so that the conductor through which the surge current may flow can be passed through the holes in such a manner that strip 16 and magnets 17 and 18 will almost surround the conductor with the planes of the strip and the magnets substantially perpendicular to the axis of the conductor. This conductor may or may not form a part of the instrument proper. For the sake of illustration, I have represented this conductor by numeral 25, and have shown it suitably secured to casing 10 by bolt and washer means 26. In Fig. 2, I have shown this conductor connected in series with a lead 27 through which a surge current may flow.

Inside of casing 10 and secured to its base is a three-arm bracket 28 on which is pivotally mounted a thin magnetic armature 29. This armature is preferably non-polarized and is preferably made of a material possessing a very low degree of magnetic rentivity. Bracket 28 and armature 29 are so arranged that the armature can simultaneously engage both projecting ends of strip 16 and can move toward and from these ends. A stop 30 secured to bracket 28 is preferably provided against which armature 29 rests when it has moved to its farthest position away from the ends of strip 16. Armature 29 is biased to move toward stop 30, by means of a spiral spring 31 having one end thereof secured to the pivoted shaft fastened to the armature and having the other end thereof secured to an adjustable arm 32. Arm 32 is rotatably mounted in an arm of bracket 28, and an axial extension from arm 32 projects through the casing. To this extension is secured a knob 33 and a pointer 34, the latter cooperating with a graduated scale 35 secured to the casing.

Inside of casing 10 and secured to its base are two brackets 36 and 37 respectively. Pivoted in bracket 36 is a thin magnetic armature 38 so that it can simultaneously engage both projecting ends of magnet 17 and can move toward and from these ends. This armature is biased to move away from the ends of magnet 17 by means of a spiral spring 39 having one end thereof secured to the pivoted shaft fastened to the armature and having the other end thereof secured to an adjustable arm 40. Pivoted in bracket 37 is a thin magnetic armature 41 so that it can simultaneously engage both projecting ends of magnet 18 and can move toward and from these ends. This armature is biased to move away from the ends of magnet 18 by means of a spiral spring 42 having one end thereof secured to the pivoted shaft fastened to the armature and the other end thereof secured to an adjustable arm 43. Armatures 38 and 41 are preferably non-polarized, and are preferably made of a material possessing a very low degree of magnetic retentivity. Cover 11 has slots 44 and 45, which are in the path of movement of armatures 38 and 41 respectively. Neither of armatures 38 and 41 has any part thereof projecting through its respective slot in cover 11 when it engages both ends of its respective magnet. However, when either armature moves away from the ends of its respective magnet, it falls through its slot in cover 11 and a substantial portion of the armature projects through the slot, as shown for example in Fig. 2 by the projection of a substantial portion of armature 38 through slot 44. Cover 11 also has a window 46 positioned above armature 29 so as to render the latter and the projecting ends of strip 16 visible from the top of the cover.

A description of the operation follows: Arms 40 and 43 are so adjusted that armatures 38 and 41 are biased to move away from the projecting ends of magnets 17 and 18, respectively, with a biasing force on each armature slightly less than the magnetic force of its magnet, and, therefore, each armature is normally held in engagement with both ends of its magnet by the magnetic force of its magnet. Now assume that a current surge passes through lead 27 in such a direction as to flow through conductor 25 from its right-hand end to its left-hand end. Some of the magnetic flux surrounding the conductor 25 during the current surge therethrough will pass through strip 16 and magnets 17 and 18. The direction of this flux will be such as to strengthen magnet 18 and weaken magnet 17, hence armature 41 will remain in engagement with both ends of magnet 18, whereas the decreased magnetic strength of magnet 17 will be insufficient to hold armature 38 against the biasing force of spring 39, and, therefore, armature 38 will drop down through slot 44, as shown in Fig. 2, thus clearly indicating that a current surge has passed through conductor 25. It is clear that if the current surge had flowed in the opposite direction through conductor 25, then magnet 17 would have been strengthened and magnet 18 would have been weakened, hence armature 38 would have remained in engagement with both ends of its magnet 17 and armature 41 would have dropped down through slot 45. When the operator sees armature 38 projecting through slot 44 he knows that a surge current has passed through conductor 25 in a certain direction, whereas if he sees armature 41 projecting through slot 45 he knows that a surge current has passed through conductor 25 in the opposite direction. If desired, arrows 47 and 48 may be secured adjacent to slots 44 and 45, respectively, as shown, to indicate the direction in which the surge current passed through the conductor. The proper positioning of these arrows may be determined by sending a surge current through conductor 25 in a known direction and then securing an arrow pointing in the same direction adjacent the slot through which dropped either one of armatures 38 or 41 in response to this surge, and then securing the other arrow pointing in the opposite direction adjacent the other slot. Each of armatures 38 and 41 is preferably made to be fairly light so as to have a low moment of inertia about its pivotal axis, and, therefore, be responsive to slow, medium, and fast surges. To the same end, magnets 17 and 18 are preferably made of thin material so as to reduce as much as is practically possible the eddy currents flowing in them when they are traversed by the magnetic flux surrounding conductor 25 during a current surge.

When a current surge flows through conductor 25 in either direction, some of the magnetic flux surrounding the conductor during the surge passes through strip 16 and magnetizes it. The magnetic flux retained by strip 16 after the surge is over depends on several factors, among which are the thickness of the strip, its distance from conductor 25, the magnetic characteristics of the strip, the maximum value of the surge current, and the time it takes the surge current to reach its maximum value from zero. During the surge, the strip is threaded by a magnetic flux of varying intensity surrounding conductor 25, hence eddy currents are caused to flow in the strip, which tends to oppose the magnetization thereof by this flux. By making strip 16 of some material having a high degree of magnetic retentivity, as, for example, cobalt steel, and by making the strip of thin material, as, for example, .005" thick, the strip will retain sufficient magnetic flux to give satisfactory measuring operation even after a very fast surge, as, for example, a ½ — 5 micro-second surge. Furthermore, the value of the magnetic flux retained by the strip at the end of the surge will then be substantially equal to that which the strip would retain if a steady, direct current of the same magnitude as the maximum value of the surge were passed through conductor 25. Since with a given maximum value of surge current, the slower the surge the lower are the eddy currents that are caused to flow in strip 16, it follows that with slower surges than a ½—5 micro-second the magnetic flux retained by the strip will also be substantially equal to that which the strip would retain if a steady, direct current of the same magnitude as the maximum value of the surge were passed through conductor 25. It therefore follows that by suitably selecting the thickness of strip 16 it is readily possible to have the magnetic flux retained by it after a surge be substantially directly proportional to the maximum value of the surge current, and be substantially independent of the duration of the surge from the slowest surge down to and including the fastest surge it is expected to measure.

When the operator sees that neither armature 38 nor 41 projects through casing 10, he knows that no surge current has passed through conductor 25. However, when he sees one of these armatures projecting through the casing, he knows that a current surge has passed through the conductor. He then goes over to the instrument to measure the maximum value of the surge current. The magnetic flux retained by strip 16 after a surge may or may not be enough to draw armature 29 into engagement with its ends. In either case the operator turns knob 33 anti-clockwise so as to make certain that armature 29 is brought into engagement with both ends of magnetized strip 16. The operator then slowly turns the knob clockwise until the force exerted by spring 31 on armature 29 is just sufficient to overcome the magnetic force of strip 16 holding the armature against its ends, and the armature then drops away from the ends of the strip, the operator becoming aware of this fact either by viewing the armature and the projecting ends of strip 16 through window 46 or by hearing the sound of the armature strike against stop 30. The operator then reads the maximum value of the surge current from the position of pointer 34 on scale 35, this scale being calibrated as described below.

After each surge, the operator, after measuring the maximum value of the surge current, demagnetizes strip 16 and magnets 17 and 18, and then remagnetizes magnets 17 and 18 so that they will have their original magnetic strengths with their original magnetic polarities, and then pushes whichever armature is projecting through the casing back into its place against the ends of its magnet. This demagnetization may be effected in any manner, as, for example, by connecting a magneto to terminals 22 and rotating the magneto armature at a continually decreasing speed until it is stopped altogether, and then doing the same with respect to terminals 23 and 24. The remagnetization may be effected in any manner, as, for example, by connecting one or more dry cells to terminals 23 and sending a predetermined value of current flow through coil 20 for a minute or so in such a direction that magnet 17 will have the relative positions of its poles N and S as shown. The same is then done with respect to terminals 24, except that the direction of current through coil 21 is to be such that magnet 18 will have the relative positions of its poles N and S as shown.

The previously referred to calibration of scale 35 may be carried out as follows: A surge current of known maximum value is sent through conductor 25, and knob 33 is turned anti-clockwise and then slowly turned clockwise until armature 29 falls away from the ends of strip 16 as previously described. The known maximum value of current is then marked on scale 35 to register with the indication of pointer 34. Strip 16 is then demagnetized, as previously described, another surge current of a different known maximum value is sent through conductor 25, the above test with knob 33 repeated, and the known maximum value of the second surge current marked on scale 35 to register with the second position of pointer 34. This process is repeated until the entire scale 35 is suitably calibrated.

The commercial value of my instrument will be evident from the following example. Assume that an electric power company operating a long transmission line supported by many towers wishes to determine which set of line insulators on any one or more of the towers had been flashed over by a lightning discharge or a switching operation, and also wishes to determine the direction and maximum value of the surge current during the flashover. This may be accomplished by removing conductor 25 from the instrument and placing such an instrument on each tower arm in such a manner that a portion of the arm passes through the instrument in place of conductor 25. To simplify the description, I will assume that conductor 25 represents a portion of such a tower arm high above the ground, and through which the surge current flows when the insulators suspended from this arm are flashed over. After each lightning storm the patrolman can make a tour of the transmission line system in a rapidly moving automobile or motorcycle and glance at each instrument on a tower as he approaches it, and if he does not see either of armatures 38 or 41 of any instrument he immediately knows that no surge current has passed through any of the arms of this tower, and he therefore proceeds without delay to the next tower. If, however, the patrolman sees either armature 38 or 41 of any instrument, then he stops, climbs the tower, measures the maximum value of the surge current as described, notes and records on his report sheet the number of the tower, the line conductor suspended from the tower arm associated with the instrument, the direction of the surge, and the maximum value of the surge current. The patrolman then demagnetizes strip 16 and magnets 17 and 18, remagnetizes magnets 17 and 18, and then pushes whichever armature is projecting through the casing back into its place against the ends of its magnet, all as previously described. Since a relatively small number of insulators will be flashed over during any one lightning storm, and since the patrolman has to climb only those towers and to record the indications of only those instruments which surround a portion of a tower arm through which a current surge has passed, it is possible for the patrolman to conduct the tour in the minimum amount of time and in the most economical manner.

If my instrument is installed in such a place that it is within close vision of an operator, as, for example, when it is installed on the switchboard of a power house for indicating and measuring the flow of a surge current through some station conductor, then cover 11 may be omitted, because the operator can readily see the positions in which armatures 38 and 41 are without making them invisible in one of their positions.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. An instrument for measuring the maximum value of an electric current surge that flowed through a conducting body, said instrument comprising a strip of magnetic material possessing a high degree of magnetic retentivity and being adapted to be so positioned adjacent the conducting body that the magnetic flux surrounding the latter during a current surge therethrough magnetizes the strip, a magnetic armature movable from one to the other of two positions, one of said positions being its attracted position when said strip is magnetized, said armature being biased to move towards its second position, whereas said strip has sufficient magnetic force to hold the armature in its attracted position after a current surge has flowed through the conducting body, means for exerting on said armature an opposing force of sufficient magnitude to overcome the magnetic force holding it in its attracted position after a surge has occurred, and means for indicating in terms of surge current the magnitude of the opposing force exerted on said armature.

2. An instrument for measuring the maximum value of an electric current surge that flowed through a conducting body, said instrument comprising a curved strip of magnetic material possessing a high degree of magnetic retentivity and having two spaced apart ends, said strip being adapted to be so positioned around the conducting body that the magnetic flux surrounding the latter during a current surge therethrough magnetizes the strip with magnetic poles of opposite polarities at its two ends, a movable magnetic armature so mounted that it can simultaneously engage both ends of said strip and can move towards and from these ends, said armature being biased to move to a position away from the ends of said strip, whereas said strip has sufficient magnetic force to hold the armature in engagement with both ends of the strip after a current surge has flowed through the conducting body, means for exerting on said armature an opposing force of sufficient magnitude to overcome the magnetic force holding it in engagement with both ends of said strip after a surge has occurred, and means for indicating in terms of surge current the magnitude of the opposing force exerted on said armature.

3. An instrument for measuring the maximum value of an electric current surge that flowed through a conducting body, said instrument comprising a curved substantially unmagnetized strip of magnetic material possessing a high degree of magnetic retentivity and having two spaced apart ends, said strip being adapted to be so positioned around the conducting body that the magnetic flux surrounding the latter during a current surge therethrough magnetizes the strip with magnetic poles of opposite polarities at its two ends, a pivotally mounted substantially non-polarized magnetic armature so mounted that it can simultaneously engage both ends of said strip and can move towards and from these ends, said armature being biased to move to a position away from the ends of said strip, whereas said strip has sufficient magnetic force to hold the armature in engagement with both ends of the strip after a current surge has flowed through the conducting body, means for exerting on said armature an opposing force of sufficient magnitude to overcome the magnetic force holding it in engagement with both ends of said strip after a surge has occurred, and means for indicating in terms of surge current the magnitude of the opposing force exerted on said armature.

4. An instrument for measuring the maximum value of an electric current surge that flowed through a conductor, said instrument comprising a casing through which the conductor can extend, a strip of magnetic material possessing a high degree of magnetic retentivity, said strip being so mounted within said casing that the magnetic flux surrounding the conductor during a current surge therethrough magnetizes the strip, a magnetic armature within said casing movable from one to the other of two positions, one of said positions being its attracted position when said strip is magnetized, said armature being biased to move towards its second position, whereas said strip has sufficient magnetic force to hold the armature in its attracted position after a current surge has flowed through the conductor, a spring for exerting on said armature a force in opposition to the magnetic force holding it in its attracted position after a surge has occurred, means extending through said casing for adjusting the force exerted by said spring on said armature, and indicating means secured to said adjusting means and to the outside of said casing for indicating in terms of surge current the force exerted by said spring in overcoming the magnetic force of said strip.

FRANCIS B. MENGER.